US011170270B2

United States Patent
Merler et al.

(10) Patent No.: US 11,170,270 B2
(45) Date of Patent: Nov. 9, 2021

(54) AUTOMATIC GENERATION OF CONTENT USING MULTIMEDIA

(71) Applicant: International Business Machines Corporation, Armonk, NY (US)

(72) Inventors: Michele Merler, Yorktown Heights, NY (US); Mauro Martino, Cambridge, MA (US); Cicero Nogueira Dos Santos, Montclair, NJ (US); Alfio Massimiliano Gliozzo, Brooklyn, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/656,389

(22) Filed: Oct. 17, 2019

(65) Prior Publication Data

US 2021/0117736 A1    Apr. 22, 2021

(51) Int. Cl.
| | |
|---|---|
| G06K 9/62 | (2006.01) |
| G06N 5/04 | (2006.01) |
| G06N 3/08 | (2006.01) |
| G06N 3/04 | (2006.01) |
| G06N 20/00 | (2019.01) |

(52) U.S. Cl.
CPC ............. *G06K 9/6281* (2013.01); *G06N 3/04* (2013.01); *G06N 3/08* (2013.01); *G06N 5/04* (2013.01); *G06N 20/00* (2019.01)

(58) Field of Classification Search
CPC .......... G06K 9/6281; G06N 3/04; G06N 3/08; G06N 5/04; G06N 20/00

USPC ........................................................ 382/159
See application file for complete search history.

(56) References Cited

U.S. PATENT DOCUMENTS

| | | | | |
|---|---|---|---|---|
| 8,732,737 B1* | 5/2014 | Kalmes | ............ | H04N 21/25883 |
| | | | | 725/14 |
| 9,129,227 B1* | 9/2015 | Yee | ........................ | G06N 20/00 |

(Continued)

FOREIGN PATENT DOCUMENTS

WO      2018081751 A1      5/2018

OTHER PUBLICATIONS

Disclosed Anonymously,"Software Modeling using multimedia enabled design characters," IPCOM000229371D, Jul. 25, 2013, 11 pages.

(Continued)

*Primary Examiner* — Juan A Torres
(74) *Attorney, Agent, or Firm* — Patterson + Sheridan, LLP

(57) ABSTRACT

Techniques for content generation are provided. A plurality of discriminative terms is determined based at least in part on a first plurality of documents that are related to a first concept, and a plurality of positive exemplars and a plurality of negative exemplars are identified using the plurality of discriminative terms. A first machine learning (ML) model is trained to classify images into concepts, based on the plurality of positive exemplars and the plurality of negative exemplars. A second concept related to the first concept is then determined, based on the first ML model. A second ML model is trained to generate images based on the second concept, and a first image is generated using the second ML model. The first image is then refined using a style transfer ML model that was trained using a plurality of style images.

20 Claims, 8 Drawing Sheets

(56) References Cited

U.S. PATENT DOCUMENTS

| | | | |
|---|---|---|---|
| 10,341,701 B2 | 7/2019 | Hirsch et al. | |
| 2016/0210321 A1* | 7/2016 | Gong | H04L 67/30 |

OTHER PUBLICATIONS

Xun Huang and Serge Belongie, "Arbitrary Style Transfer in Real-time with Adaptive Instance Normalization," arXiv:1703.06868v2 [cs.CV] Jul. 30, 2017, 11 pages.

Reed et al., "Generative Adversarial Text to Image Synthesis," arXiv:1605.05396v2 [cs.NE] Jun. 5, 2016, 10 pages.

Karras et al., "Progressive Growing of GANS for Improved Quality, Stability, and Variation," Published as a conference paper at ICLR 2018, arXiv:1710.10196v3 [cs.NE] Feb. 26, 2018, 26 pages.

David Berthelot, Thomas Schumm, Luke Metz,"BEGAN: Boundary Equilibrium Generative Adversarial Networks," arXiv:1703.10717v4 [cs.LG] May 31, 2017, 10 pages.

Zizhao Zhang, Yuanpu Xie and Lin Yang, "Photographic Text-to-Image Synthesis with a Hierarchically-nested Adversarial Network," arXiv:1802.09178v2 [cs.CV] Apr. 6, 2018, 15 pages.

Yuan Li and Benjamin Sapp, "Mapping Tokens to Images," IPCOM000251292D,Oct. 29, 2017, 13 pages.

Disclosed Anonymously,"Image Moderation Using Machine Learning," IPCOM000252007D, Dec. 13, 2017, 35 pages.

Disclosed Anonymously,"System and Method for Comprehension and Inference of DL Model from Image Sources," IPCOM000254732D, Jul. 26, 2018, 8 pages.

Nack et al.,"The Role of Highlevel and Lowlevel Features in Style-based Retrieval and Generation of Multimedia Presentations," CWI Amsterdam, 16 pages.

Mao et al., "DeepArt: Learning Joint Representations of Visual Arts," 2017 Association for Computing Machinery, 9 pages.

Augusto Celentano and Ombretta Gaggi,"Schema Modelling for Automatic Generation of Multimedia Presentations," Universit 'a Ca' Foscari, 8 pages.

Lyndon Kennedy,"Advanced Techniques for Multimedia Search: Leveraging Cues from Content and Structure," Columbia University, 2009, 184 pages.

Rennie et al.,"Self-critical Sequence Training for Image Captioning," CVPR 2017, 16 pages.

Vinyals et al., "Show and Tell: A Neural Image Caption Generator," CVPR, 2014, 9 pages.

Borth et al, "Large-scale Visual Sentiment Ontology and Detectors Using Adjective Noun Pairs," Oct. 21-25, 2013, 10 pages, http://dx.doi.org/10.1145/2502081.2502282.

Goodfellow et al., "Generative Adversarial Nets," Universit'e de Montr'eal, 9 pages.

Gatys et al, "Image Style Transfer Using Convolutional Neural Networks," CVPR, 10 pages.

David Alvarez-Melis and Judith Amores, The Emotional GAN : Priming Adversarial Generation of Art with Emotion, in NIPS Workshop, 2017.

A. Radford, L. Metz, and S. Chintala. Unsupervised representation learning with deep convolutional generative adversarial networks. In International Conference on Learning Representations (ICLR), 2016.

Li et al.,"Generative feature matching networks. In Submitted to International Conference on Learning Representations," (ICLR), 2015, 9 pages.

IBM Research Editorial Staff, "AI and Human Creativity Go Hand in Hand," Oct. 19, 2018, IBM Research Blog [https://www.ibm.com/blogs/research/2018/10/ai-creativity/] (Grace Period Disclosure/Inventor Originated Disclosure).

David Alvarez-Melis and Judith Amores, The Emotional GAN : Priming Adversarial Generation of Art with Emotion, in NIPS Workshop, 2017, 4 pages.

* cited by examiner

AUTOMATIC GENERATION OF CONTENT USING MULTIMEDIA

BACKGROUND

The present disclosure relates to machine learning, and more specifically, to using machine learning to automatically generate and stylize visualizations.

A wide variety of machine learning techniques have been developed to perform tasks such as analysis and classification of input data. These models typically require extensive training using existing data. Although machine learning can perform such evaluation of existing content quite accurately, existing models are not suited to creation of new content. Currently, significant human effort is required to generate new content (such as artistic visualizations), as existing systems cannot teach creativity or originality to trained models. Additionally, with increasing content-generation needs, it has become increasingly difficult or impossible to create high-quality visualizations to be published.

STATEMENT REGARDING PRIOR DISCLOSURES BY THE INVENTOR OR A JOINT INVENTOR

The following disclosure(s) are submitted under 35 U.S.C. 102(b)(1)(A): "AI and Human Creativity Go Hand in Hand," IBM Research Editorial Staff, Oct. 19, 2018, available at https://www.ibm.com/blogs/research/2018/10/ai-creativity/.

SUMMARY

According to one embodiment of the present disclosure, a method is provided. The method includes determining a plurality of discriminative terms based at least in part on a first plurality of documents that are related to a first concept, and identifying a plurality of positive exemplars and a plurality of negative exemplars using the plurality of discriminative terms. The method further includes training a first machine learning (ML) model to classify images into concepts, based on the plurality of positive exemplars and the plurality of negative exemplars. A second concept related to the first concept is then determined, based on the first ML model. Additionally, the method includes training, based on the second concept, a second ML model to generate images. A first image is then generated using the second ML model, and the first image is refined using a style transfer ML model that was trained using a plurality of style images.

According to a second embodiment of the present disclosure, a computer-readable storage medium is provided. The computer-readable storage medium contains computer program code that, when executed by operation of one or more computer processors, performs an operation. The operation includes determining a plurality of discriminative terms based at least in part on a first plurality of documents that are related to a first concept, and identifying a plurality of positive exemplars and a plurality of negative exemplars using the plurality of discriminative terms. The operation further includes training a first machine learning (ML) model to classify images into concepts, based on the plurality of positive exemplars and the plurality of negative exemplars. A second concept related to the first concept is then determined, based on the first ML model. Additionally, the operation includes training, based on the second concept, a second ML model to generate images. A first image is then generated using the second ML model, and the first image is refined using a style transfer ML model that was trained using a plurality of style images.

According to a third embodiment of the present disclosure, a system is provided. The system includes one or more computer processors, and a memory containing a program which, when executed by the one or more computer processors, performs an operation. The operation includes determining a plurality of discriminative terms based at least in part on a first plurality of documents that are related to a first concept, and identifying a plurality of positive exemplars and a plurality of negative exemplars using the plurality of discriminative terms. The operation further includes training a first machine learning (ML) model to classify images into concepts, based on the plurality of positive exemplars and the plurality of negative exemplars. A second concept related to the first concept is then determined, based on the first ML model. Additionally, the operation includes training, based on the second concept, a second ML model to generate images. A first image is then generated using the second ML model, and the first image is refined using a style transfer ML model that was trained using a plurality of style images.

DETAILED DESCRIPTION

Figure 1A:
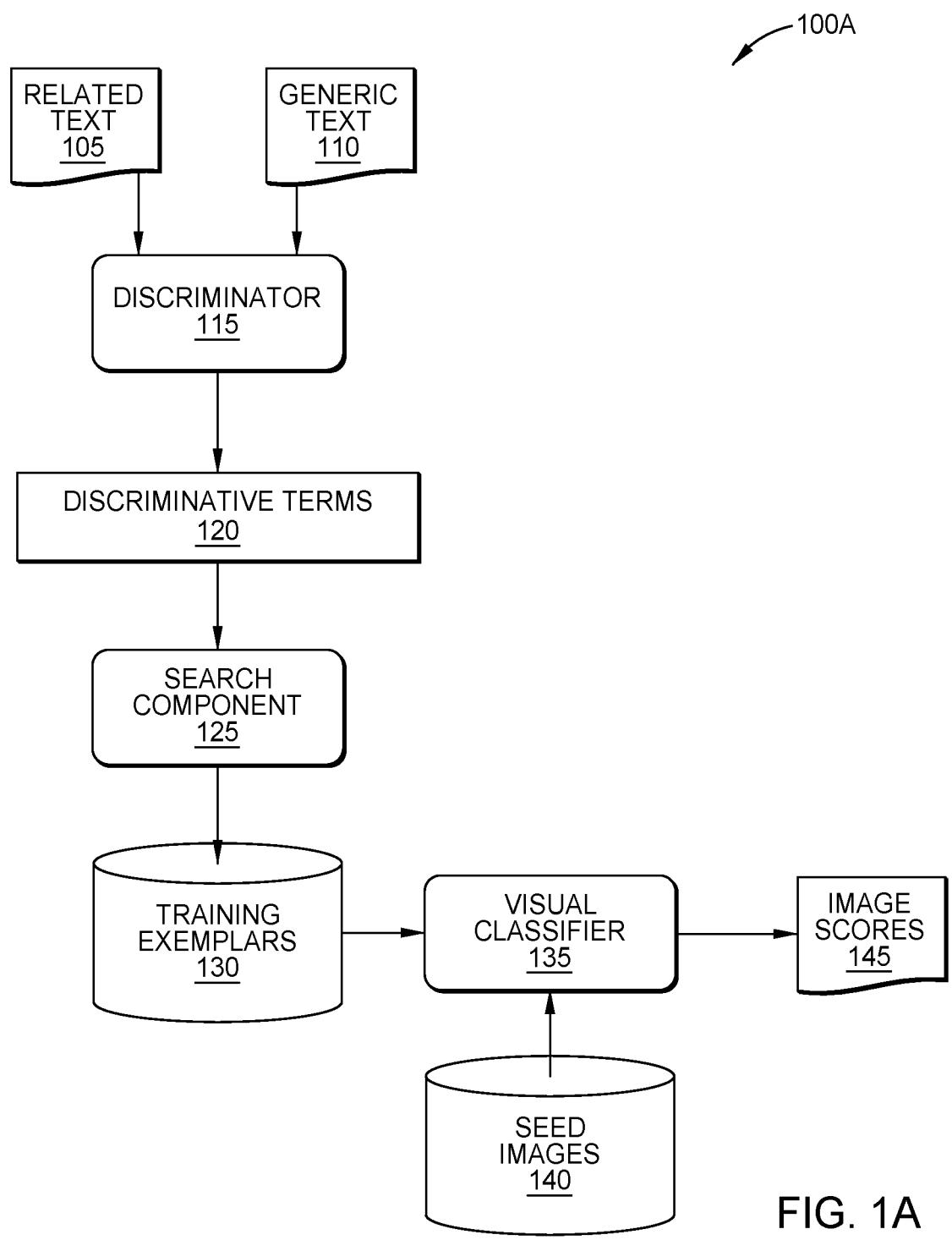
FIGS. 1A and 1B illustrate a workflow for training and using machine learning models to generate visualizations, according to one embodiment disclosed herein.

Embodiments of the present disclosure provide techniques to automatically generate new content (e.g., visualizations) using machine learning. In this disclosure, several examples including image generation are used to demonstrate the underlying techniques. However, embodiments of the present disclosure can readily be applied to a variety of content, including audio, video, and the like. In one embodiment, a multi-modal discriminative and generative framework is provided, which is capable of assisting humans (or acting entirely autonomously) in producing visual content related to a given theme or concept, starting from a collection of documents (textual, visual, or both). This framework can be used by users (e.g., editors) to generate images for articles, books, music album covers, and the like.

Starting from a corpus of documents and one or more keyword terms, the system generates an image reflecting the inputs. In at least one embodiment, the system utilizes a pipeline described below, which involves three major steps: a first phase to identify core visual concepts, a second phase to generate a new visualization reflecting the concept, and a third phase to stylize the image appropriately. In an embodiment, the workflow begins by identifying a core visual concept using an input corpus including multimedia or textual documents to learn the visual concept. Given a desired concept or topic (e.g., "artificial intelligence"), the system builds a corpus including some documents related to that topic, and a portion that is unrelated to it. In one embodiment, the system selects an equal number of related and unrelated documents. In embodiments, the system can recognize related and unrelated documents using corresponding metadata tags for each document (e.g., provided by the publisher), using keyword searching, and the like.

In some embodiments, the system then applies natural language processing (NLP) tools to identify key terms for each document, and uses this representation to train a discriminative text model (DTM). Next, the dimensions in the vector space with the highest weights accorded by the DTM can be used to identify the most discriminative semantic concepts for the input topic. In an embodiment, the system identifies positive discriminative terms (e.g., terms that are highly correlated with the input topic) as well as negative terms (e.g., terms that are highly unrelated to the concept). These terms can then be used to collect images (e.g., using a web image search engine), and a visual recognition deep neural network can be trained to visually determine, in discriminative fashion, the appearance of the topic in the images. That is, the model can classify and score images based on how related they are to the input topic, such as "artificial intelligence."

In an embodiment, the recognition network is then used to rank images according to their strength of depicting or representing the concept. In at least one embodiment, these images are collected from all or a portion of the original input corpus. For example, in one embodiment, the images are collected from the articles or documents that are tagged or otherwise associated with the topic (e.g., the "positive" or related documents). In some embodiments, the high-scoring images are used to identify a new, related concept for the visual generative process. This may be accomplished by allowing a human to review the images to identify a concept reflected in them. In another embodiment, the images are evaluated using one or more image captioning techniques or models, and NLP is applied to these generated captions to identify one or more concepts.

In an embodiment, the identified related concept(s) become the basis for the generative process. The new concept can be used to build a training data set of images (e.g., by searching the Internet) based on the concept (or keywords associated with the concept). In some embodiments, a generative neural network is then trained to create new images, based on the training set. In at least one embodiment, the output of this model can be used as the final image. In another embodiment, the generated images may undergo additional processing. For example, in some embodiments, the output of the generative model may be relatively low resolution, and therefore unsuitable for publication. Additionally, in one embodiment, it is desirable to refine or modify the generated image to better-reflect the desired style of the final image.

In some embodiments, therefore, a neural style transfer approach is applied to learn and transfer the style or themes from a set of one or more style exemplars. In at least one embodiment, rather than transferring the style of a single image, a number of images can be collected and tiled together to form a single style reference image. The style transfer network can then be trained using this image. In this way, embodiments of the present disclosure can produce images aligned with the original input concept, while matching the desired style or visual language. In an embodiment, the style may correspond to an existing style (e.g., cover art for the magazine in which the image is to be published), or a more abstract expression such as an emotion. In embodiments, the components of the pipeline can be substituted or re-arranged in any number of ways during the creative process. For example, one of the selected images (scored by the visual recognition model) could be directly employed as input to the neural style transfer model, instead of using a fully generative solution.

Figure 1B:
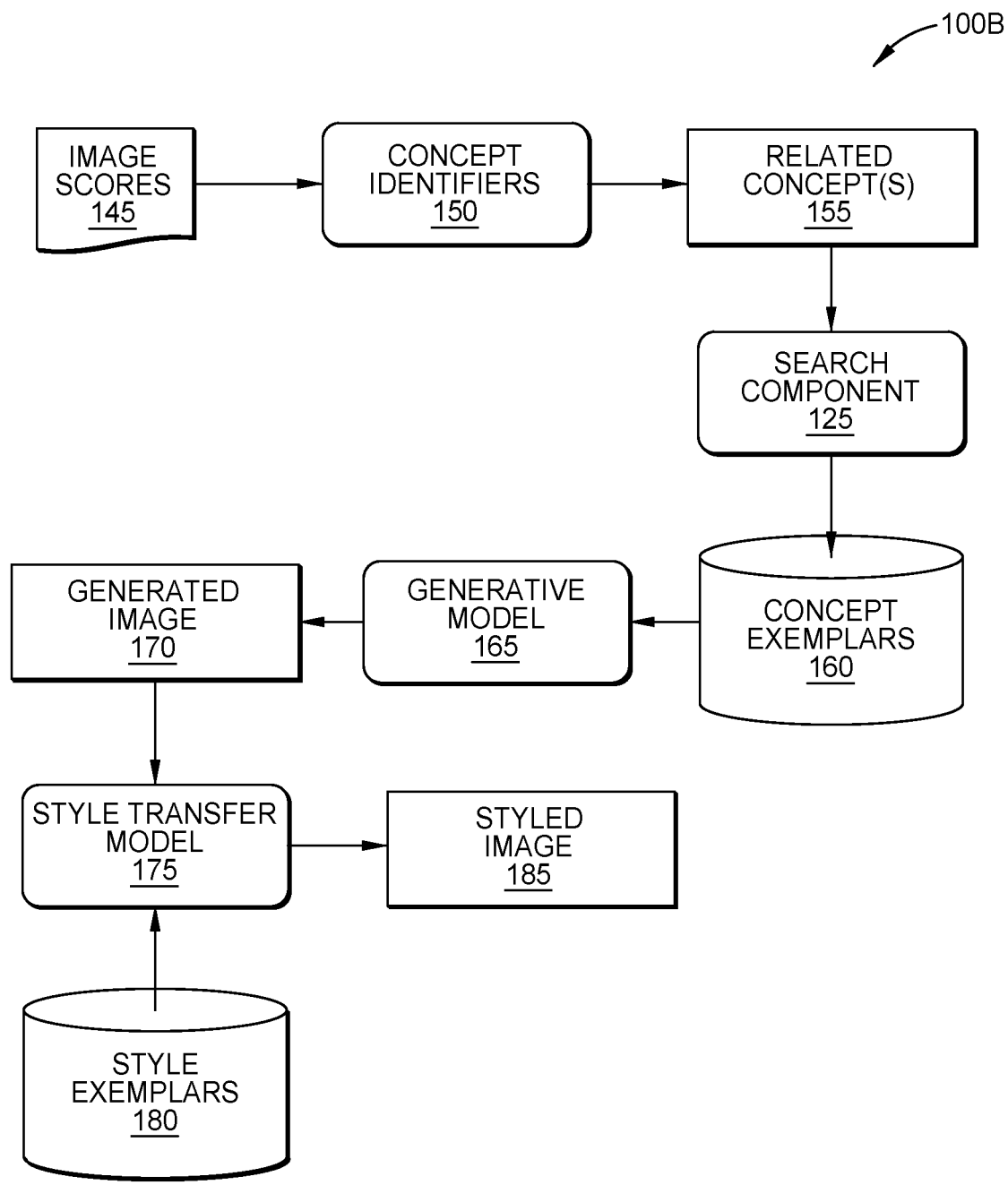

FIGS. 1A and 1B illustrate a workflow for training and using machine learning models to generate visualizations, according to one embodiment disclosed herein. As illustrated in FIG. 1A, the workflow 100A begins with a set of Related Text 105 and a set of Generic Text 110. In some embodiments, these documents are collected and provided to the system. In another embodiment, the original input corresponds to a desired topic or concept, and the system autonomously retrieves the Related Text 105 and Generic Text 110. Generally, the Related Text 105 corresponds to one or more documents including natural language text that discusses, relates to, or is otherwise associated with the desired topic. Similarly, the Generic Text 110 includes natural language text that is unrelated to the indicated topic.

In one embodiment, the system retrieves these documents by executing one or more searches or queries using the input concept and/or keywords. For example, if the desired topic of the final image is "artificial intelligence" or "AI," the system can identify Related Text 105 by retrieving documents labeled or tagged with "artificial intelligence" or "AI," as well as Generic Text 110 corresponding to documents that are not labeled with such tags. In some embodiments, the Related Text 105 and/or Generic Text 110 may be collected from documents that also include other media, such as images, audio, and/or video.

In the illustrated workflow, the Related Text 105 and Generic Text 110 are provided to a Discriminator 115, which is a model configured to use NLP to identify the most important words, terms, and/or phrases for each document. By aggregating across the Related Text 105, the system can identify terms that are most descriptive or indicative of the desired concept. Similarly, by aggregating across the Generic Text 110, the system can identify terms that are most descriptive or indicative of unrelated concepts or topics. In one embodiment, the system identifies a predefined number of terms that are most positive and most negative. These Discriminative Terms 120 and then provided to a Search Component 125.

The Search Component 125 is configured to identify and retrieve data (e.g., images) using the Discriminative Terms 120. For example, in one embodiment, the Search Component 125 uses each term to perform an image search, and thereby builds a corpus of Training Exemplars 130 reflecting the Discriminative Terms 120. In at least one embodiment, the Discriminative Terms 120 include positive terms (e.g., terms that are associated with the input topic) and negative terms (e.g., terms that are unrelated or tend to indicate the article is not associated with the topic). In such an embodiment, the Training Exemplars 130 can similarly include positive exemplars that reflect the topic, as well as negative exemplars that are unrelated to the input topic.

In the depicted workflow, these Training Exemplars 130 are then used to train a Visual Classifier 135 to distinguish input images based on the topic/concepts. For example, the Visual Classifier 135 can be a classifier machine learning (ML) model trained by providing each Training Exemplar 130 as input, while using the corresponding target classification as desired output. For positive exemplars (e.g., images that reflect the input topic), the desired output is positive or affirmative, while the desired output for negative exemplars is negative or "unrelated." In this way, given a new image, the Visual Classifier 135 can evaluate it and output a score for the image (e.g., ranging from 0 to 1) indicating a confidence and/or probability that it reflects the desired concept. Stated differently, images that depict the concept (e.g., "AI") will tend to be scored relatively highly, while unrelated images that do not depict the concept will score lower.

Once the Visual Classifier 135 is trained, it is used to score a number of Seed Images 140 based on their relatedness to the topic. This results in the creation of a set of Image Scores 145 for the Seed Images 140. In one embodiment, the Seed Images 140 are collected from the set of documents used as the Related Text 105. The Seed Images 140 generally reflect a set of images or exemplars that may or may not reflect the desired topic. The Visual Classifier 135 is used to generate a score for each, in order to identify Seed Images 140 that are highly-related or representative to the concept.

Turning to FIG. 1B, the workflow 100B continues where the Image Scores 145 (and the underlying images) are provided to a Concept Identifier 150. As illustrated, the Concept Identifier 150 is used to identify one or more Related Concepts 155 based on the ranked Seed Images 140. In one embodiment, the top N Seed Images 140 are provided to one or more human users, who identify one or more themes or concepts that are reflected in the images. For example, during testing, given "AI" as a desired concept, several of the highest-scored Seed Images 140 depicted a handshake between a human hand and a robot hand. This concept was then selected as the Related Concept 155 used as the basis to generate a new image.

In at least one embodiment, the Concept Identifier 150 identifies Related Concept(s) 155 without input from a user. For example, in one embodiment, the Concept Identifier 150 uses one or more image captioning techniques or models to automatically generate natural language captions or descriptions for one or more of the highest-ranked Seed Images 140. The Concept Identifier 150 can then apply NLP to identify concepts, terms, and topics that are reflected in the highest-scoring images.

In the illustrated embodiment, the Related Concepts 155 are provided to the Search Component 125, which again performs a search to identify and retrieve images based on the concepts. This forms a corpus of Concept Exemplars 160 that reflect the Related Concept(s) 155. These Concept Exemplars 160 are then used to train a Generative Model 165. In one embodiment, the Generative Model 165 is a generative adversarial network (GAN). Once trained, the Generative Model 165 can be used to generate one or more Generated Images 170 based on the training. Because the training data corresponds to Concept Exemplars 160 that reflect one or more Related Concepts 155, the Generated Images 170 therefore also relate to or depict these Related Concepts 155. Recall further that the Related Concepts 155 are closely-aligned with the original input topic or concept. Thus, the Generated Images 170 are generally illustrative of the originally-received concept.

In one embodiment, to create the Generated Image(s) 170, the system generates and provides a random input vector to the Generative Model 165. That is, the system can generate a random, pseudo-random, or quasi-random value for each dimension in the input space, and provide this vector as input to generate the Generated Image 170. In some embodiments, the system generates multiple Generated Images 170 using random inputs, and a user can select from among them. The Generated Image 170 is then provided to a Style Transfer Model 175.

As illustrated, the Style Transfer Model 175 is trained using a set of Style Exemplars 180. In traditional systems, style transfer involves using a single style image as the basis/target style. In embodiments of the present disclosure, any number of Style Exemplars 180 can be utilized. In one embodiment, the Style Exemplars 180 are tiled or arrayed to form a single reference, which is used to train the Style Transfer model 175. In some embodiments, the Style Exemplars 180 are selected based on the desired style or appearance of the final image. For example, if the image is being generated for an album cover, the Style Exemplars 180 can include previous album covers from the artist, and/or other images that reflect the desired style. Similarly, if the image is being generated as cover art for a magazine, the Style Exemplars 180 can include previous covers of the magazine.

In at least one embodiment, the Style Exemplars 180 are collected based on a more abstract style, such as an emotion. For example, a search can be executed using one or more keywords like "happiness," and the resulting images can be used as the basis for the Style Transfer Model 175. This approach can be used to generate any number of Styled Images 185. In one embodiment, a number of Styled Images 185 are created by styling the Generated Image 170 using different Style Exemplars 180 (e.g., one representing happiness, one representing sadness, and the like). A user can then select from among the Styled Images 185. In an embodiment, the Styled Image 185 is then returned.

Figure 2:
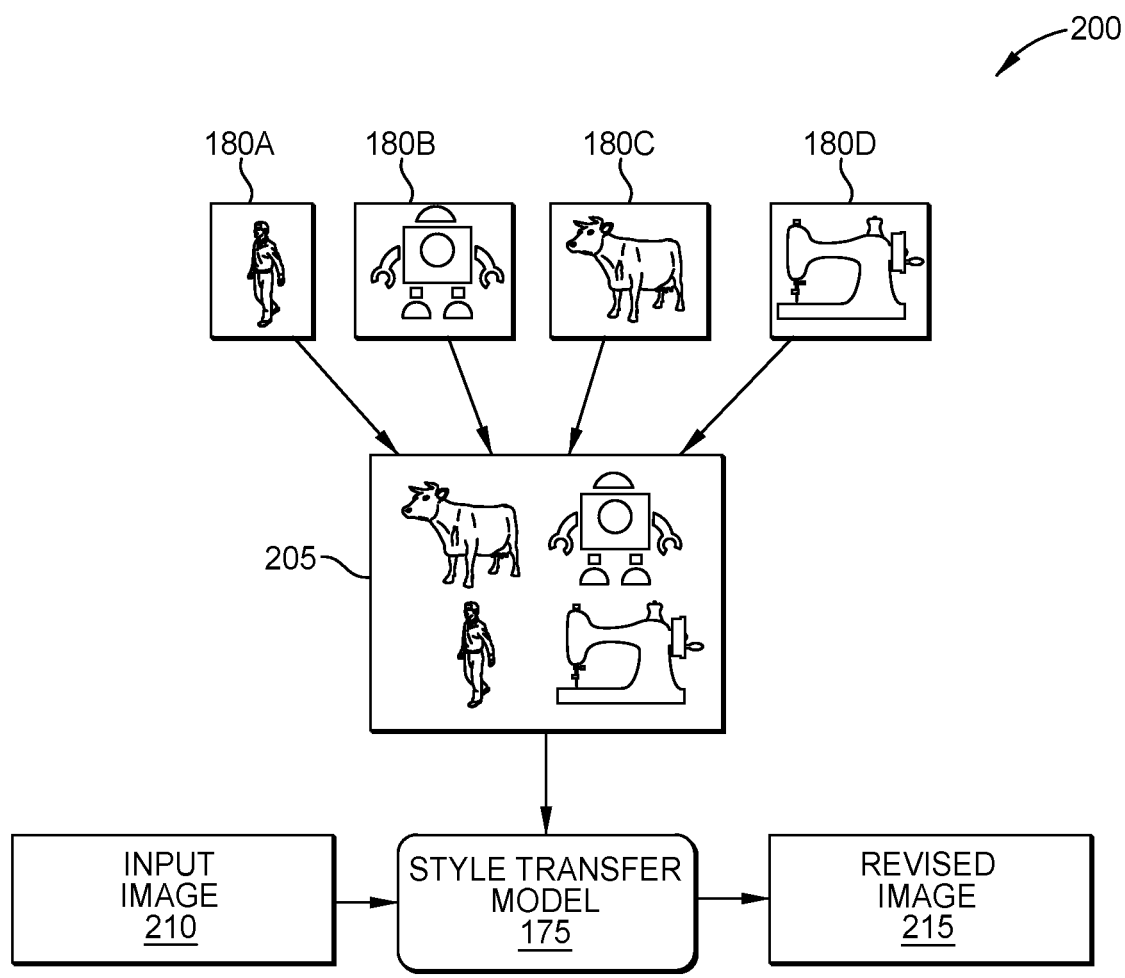
FIG. 2 depicts a workflow for training and applying a style transfer model, according to one embodiment disclosed herein.

FIG. 2 depicts a workflow 200 for training and applying a style transfer model, according to one embodiment disclosed herein. In the illustrated embodiment, a set of Style Exemplars 180A-D are provided as input. Although depicted as black and white silhouettes, in embodiments, the Style Images 180 may of course include more detailed images, colors, and the like. The Style Images 180 generally reflect the desired style for the final input. As illustrated, the Style Images 180 are tiled, arrayed, or otherwise aggregated to create a single Reference Image 205, which acts as the basis for the Style Transfer Model 175. Using this Reference Image 205, the Style Transfer Model 175 receives Input Images 210 and returns Revised Images 215 that better reflect the style and appearance of the Reference Image 205, as discussed above.

Figure 3:
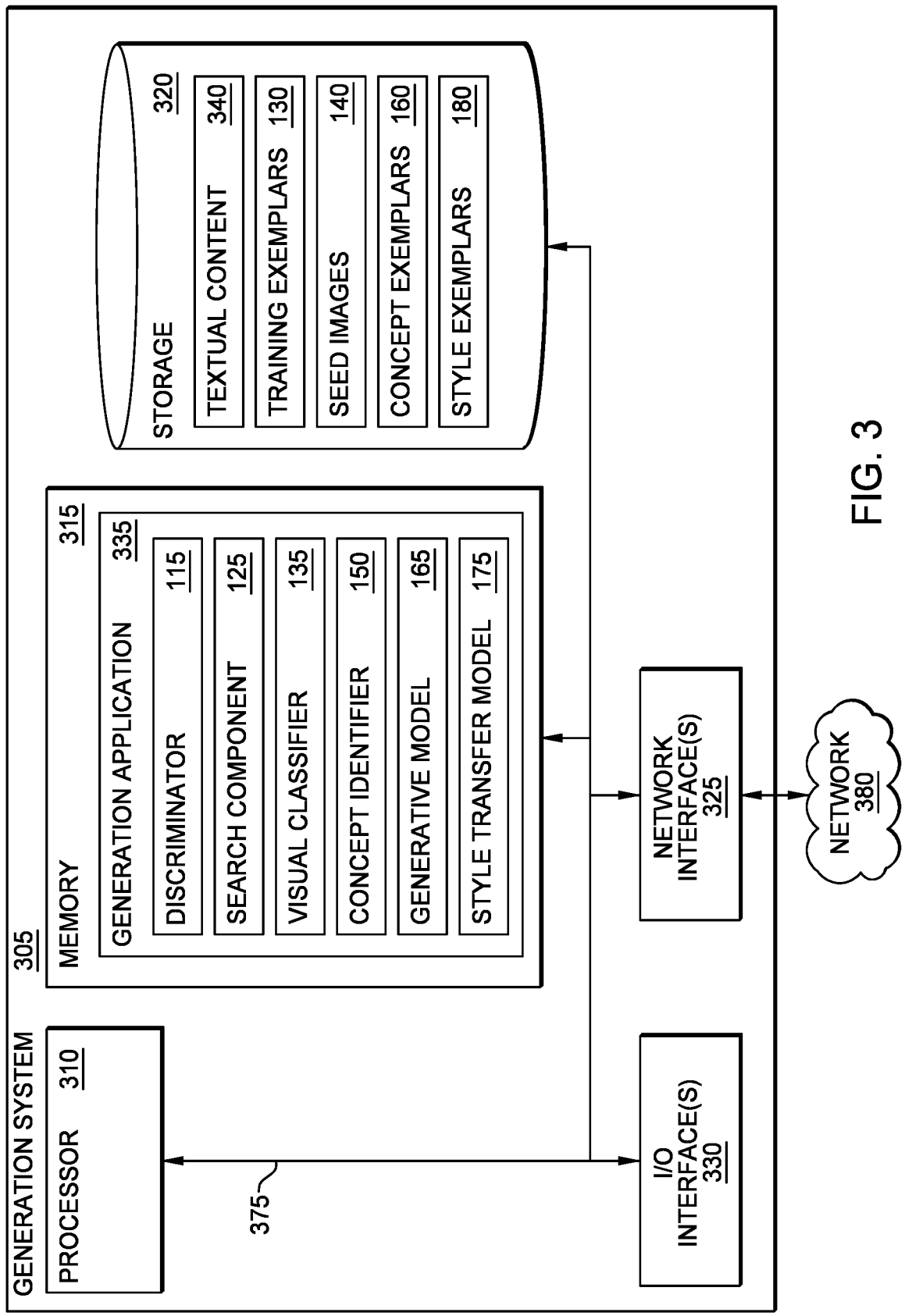
FIG. 3 is a block diagram depicting a generation system configured to ingest multimedia and generate visualizations using machine learning, according to one embodiment disclosed herein.

FIG. 3 is a block diagram depicting a Generation System 305 configured to ingest multimedia and generate visualizations using machine learning, according to one embodiment disclosed herein. Although depicted as a physical device, in embodiments, the Generation System 305 may be implemented using virtual device(s), and/or across a number of devices (e.g., in a cloud environment). As illustrated, the Generation System 305 includes a Processor 310, Memory 315, Storage 320, a Network Interface 325, and one or more I/O Interfaces 330. In the illustrated embodiment, the Processor 310 retrieves and executes programming instructions stored in Memory 315, as well as stores and retrieves application data residing in Storage 320. The Processor 310 is generally representative of a single CPU and/or GPU, multiple CPUs and/or GPUs, a single CPU and/or GPU having multiple processing cores, and the like. The Memory 315 is generally included to be representative of a random access memory. Storage 320 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 330. Further, via the Network Interface 325, the Generation System 305 can be communicatively coupled with one or more other devices and components (e.g., via the Network 380, which may include the Internet, local network(s), and the like). As illustrated, the Processor 310, Memory 315, Storage 320, Network Interface(s) 325, and I/O Interface(s) 330 are communicatively coupled by one or more Buses 375. In the depicted embodiment, the Storage 320 includes Textual Content 340, Training Exemplars 130, Seed Images 140, Concept Exemplars 160, and Style Exemplars 180. Although depicted as residing in Storage 320, in embodiments, the data may reside in any suitable location, including in Memory 315, or in one or more remote storage locations.

In an embodiment, the Textual Content 340 corresponds to the Related Text 105 and/or Generic Text 110. The Training Exemplars 130, Seed Images 140, Concept Exemplars 160, and Style Exemplars 180 are each described in more detail above. In the illustrated embodiment, the Memory 315 includes a Generation Application 335. Although depicted as software residing in Memory 315, in embodiments, the functionality of the Generation Application 335 can be implemented via hardware, software, or a combination of hardware and software.

The Generation Application 335 is generally configured to generate stylized output images, given a desired topic or concept. The Generation Application 335 includes the Discriminator 115, Search Component 125, Visual Classifier 135, Concept Identifier 150, Generative Model 165, and Style Transfer Model 175. Each of these components is discussed in more detail above with reference to FIGS. 1A and 1B. Although depicted as discrete components for conceptual clarity, in embodiments, the operations of the Discriminator 115, Search Component 125, Visual Classifier 135, Concept Identifier 150, Generative Model 165, and Style Transfer Model 175 may be combined or distributed across any number of components and devices.

Figure 4:
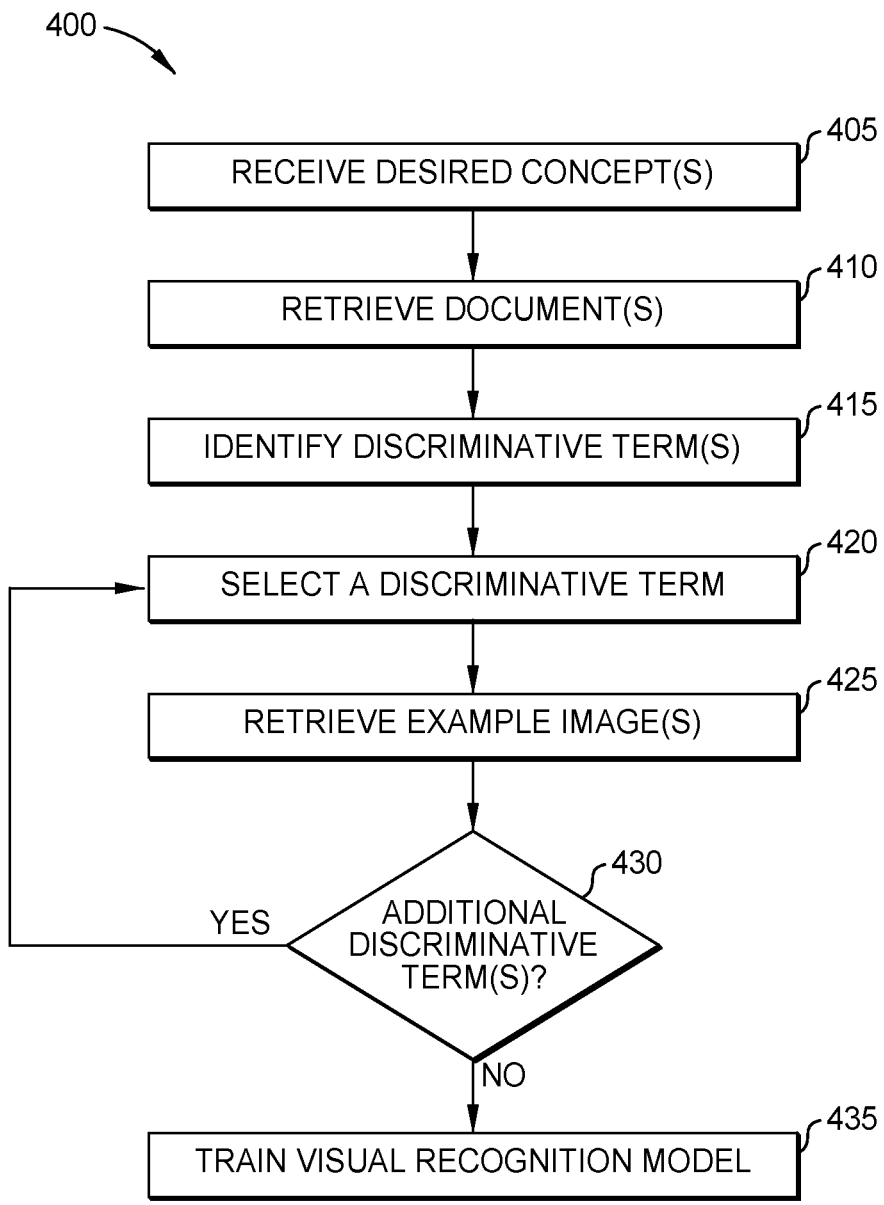
FIG. 4 is a flow diagram illustrating a method for training a visual recognition model to facilitate automatic generation of visual content, according to one embodiment disclosed herein.

FIG. 4 is a flow diagram illustrating a method 400 for training a visual recognition model to facilitate automatic generation of visual content, according to one embodiment disclosed herein. The method 400 begins at block 405, where the Generation Application 335 receives an indication of the desired topic(s) or concept(s) for the output image(s). In one embodiment, the indication includes one or more keywords, terms, and/or phrases describing the concept. For example, the input concept may be "artificial intelligence" or "AI." The method 400 then proceeds to block 410, where the Generation Application 335 retrieves or receives a set of documents to be used as the initial corpus. In one embodiment, the Generation Application 335 does so by identifying a first set of documents that relate to the indicated topics or concepts (to be used as positive exemplars), as well as a second set of documents that do not relate to the topic (to be used as negative exemplars).

For example, in one embodiment, the Generation Application 335 relies on tags, labels, or keywords associated with each document (e.g., previously-written articles). In another embodiment, the Generation Application 335 performs one or more searches using the indicated concept(s). In at least one embodiment, the retrieved documents are collected from the entity for which the final output image is being generated. For example, if the original request is to generate a cover picture for a magazine, the Generation Application 335 may retrieve previous articles from the magazine to be used.

The method 400 then proceeds to block 415, where the Generation Application 335 identifies a set of discriminative terms based on the retrieved documents. In some embodiments, this includes applying one or more NLP techniques or models to determine a set of positive terms that are correlated with or indicative of the original concept, as well as a set of negative terms that are unrelated to the original concept and/or indicate that the document does not discuss the received concept. In one embodiment, the Generation Application 335 uses the retrieved documents (and their label as positive or negative) to train a discriminative text model that can classify or score input text as related or unrelated to the concept. The Generation Application 335 can then identify the term(s) which are weighted the highest in the model (indicating that, during training, they were most-indicative of relatedness), and use these terms as the discriminative terms. In one embodiment, the Generation Application 335 selects a predefined number of positive and negative terms, beginning with the highest-weighted term for each.

At block 420, the Generation Application 335 selects one of the discriminative terms. The method 400 then continues to block 425, where the Generation Application 335 retrieves one or more example images based on the selected term. For example, the Generation Application 335 may execute one or more image searches using the selected term to identify and retrieve images. The Generation Application 335 can then label these images based on whether the selected term is a positive or negative term. This allows the Generation Application 335 to use the labeled images to train the visual discrimination model to identify and score visual characteristics of input.

The method 400 then continues to block 430, where the Generation Application 335 determines whether there is at least one additional discriminative term that has not yet been used to retrieve images. If so, the method 400 returns to block 420. Otherwise, the method 400 continues to block 435, where the Generation Application 335 trains a visual recognition/discrimination model (e.g., a classifier) based on the retrieved example images. For example, the Generation Application 335 can iteratively apply an image as input while the target label (e.g., related or unrelated to the received concept) is used as the target output, which enables the internal weights of the model to be iteratively refined. Once training is complete, the visual recognition model can receive input images and classify it as related or unrelated to the original concept. In one embodiment, this includes generating a score or confidence that the classification is correct (e.g., that the image is associated or unassociated with the concept). This confidence can be used to rank the images based on their relatedness to the original concept.

Figure 5:
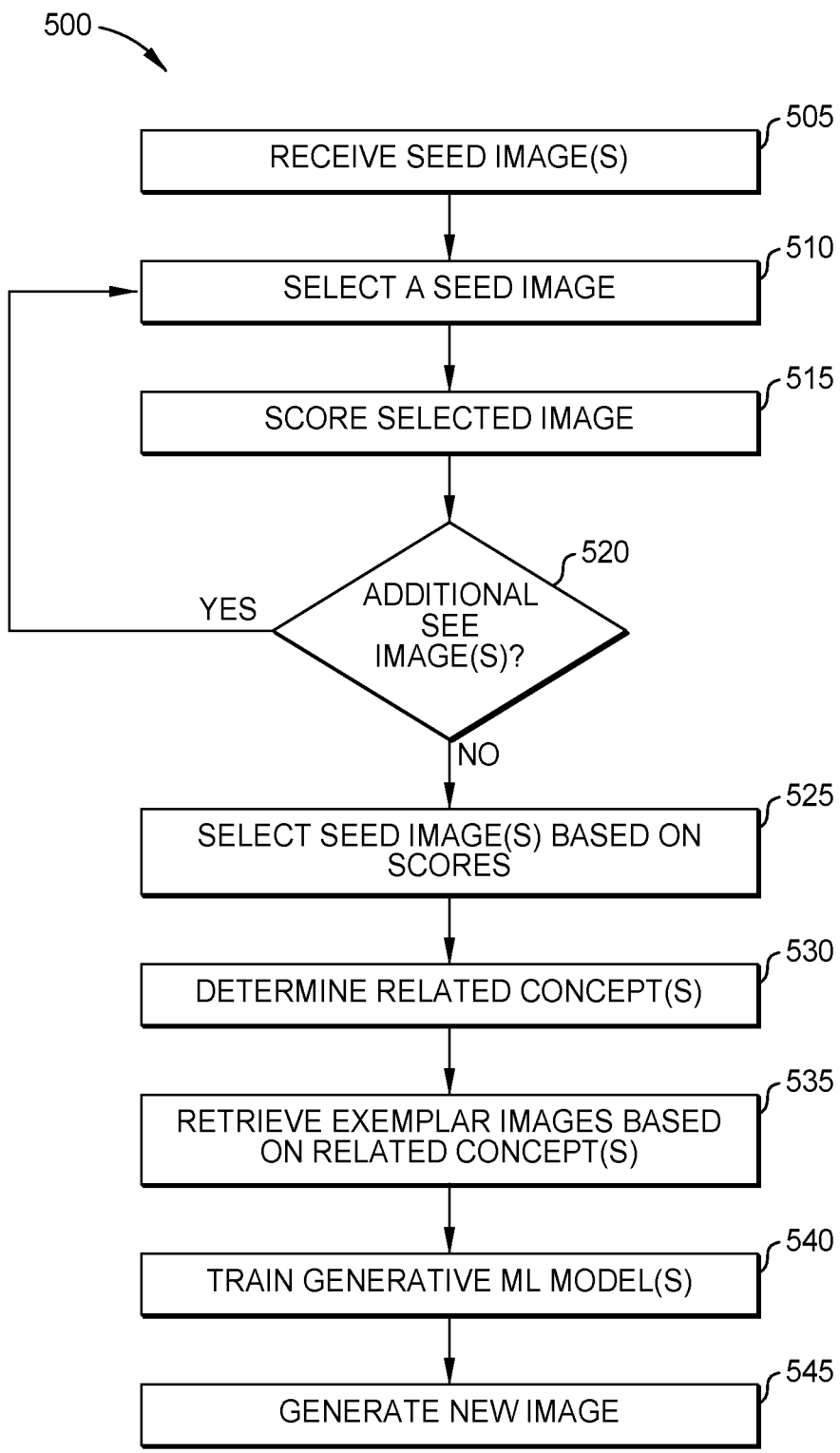
FIG. 5 is a flow diagram illustrating a method for generating visual content using machine learning, according to one embodiment disclosed herein.

FIG. 5 is a flow diagram illustrating a method 500 for generating visual content using machine learning, according to one embodiment disclosed herein. The method 500 begins at block 505, where the Generation Application 335 receives one or more seed images. In an embodiment, the seed images will be evaluated by the visual recognition model in order to rank them and identify additional concepts or topics that are related to the originally-received concept. In at least one embodiment, the seed images are extracted from the documents that were retrieved in block 410 of FIG. 4. For example, in one such embodiment, the Generation Application 335 retrieves documents including text and images, and uses the text to identify discriminative terms. At block 505, the Generation Application 335 can use the included images as seed images. In some embodiments, the Generation Application 335 only uses images that were included in documents labeled as related to the concept.

At block 510, the Generation Application 335 selects one of the received/retrieved seed images. The method 500 then proceeds to block 515, where the Generation Application 335 uses the trained visual recognition model to evaluate and score the selected image. As discussed above, this score reflects a level of relatedness of the selected image to the underlying received concept. Images that are relevant to the concept will be scored relatively higher, while images that are unrelated will be scored lower. In this way, the Generation Application 335 can rank the images based on how much they visually exemplify the original concept.

The method 500 then proceeds to block 520, where the Generation Application 335 determines whether there is at least one additional seed image that is yet to be scored. If so, the method 500 returns to block 510. Otherwise, the method 500 continues to block 525, where the Generation Application 335 selects one or more of the seed images based on their scores. In one embodiment, the Generation Application 335 selects a predefined number of images in descending order based on their score. For example, the Generation Application 335 may select the top ten images. The method 500 continues to block 530, where the Generation Application 335 determines one or more concepts, topics, or themes reflected by the selected image(s).

In one embodiment, this is accomplished by providing the images to one or more users, who provide a natural language description of the concept(s) and themes depicted in the image(s). In another embodiment, the image(s) are evaluated by a trained image captioning model, which generates captions for each. These captions can then be parsed to extract important themes and concepts. Once one or more related concept(s) are identified, the method 500 continues to block 535, where the Generation Application 335 retrieves additional exemplar images using the related concepts.

For example, in one embodiment, the Generation Application 335 executes one or more web-based image searches using the related concept(s) as keywords or phrases. Once a sufficient number of images are collected, the method 500 proceeds to block 540, where the Generation Application 335 trains one or more generative models using the retrieved images. The generative model is generally trained to receive an input vector and output a new image based on the vector. The method 500 then continues to block 545, where the Generation Application 335 generates a new image using the generative model. In at least one embodiment, the Generation Application 335 does so by providing a random vector as input to the model.

In some embodiments, this generated new image is then returned to the requesting entity. In at least one embodiment, however, the new image is first processed using a style transfer model to refine the image such that it better reflects the desired style or theme. For example, for an article about how AI can improve the world, the user may request a new image based on the concept of "artificial intelligence," with a style of "hope." Alternatively, if the article relates to how AI may be dangerous in the future, the user may request an image with a style of "fear." In embodiments, even if the generated image is the same, the resulting stylized image can differ significantly based on the selected theme/style. This provides deeper and more engaging visualizations.

Figure 6:
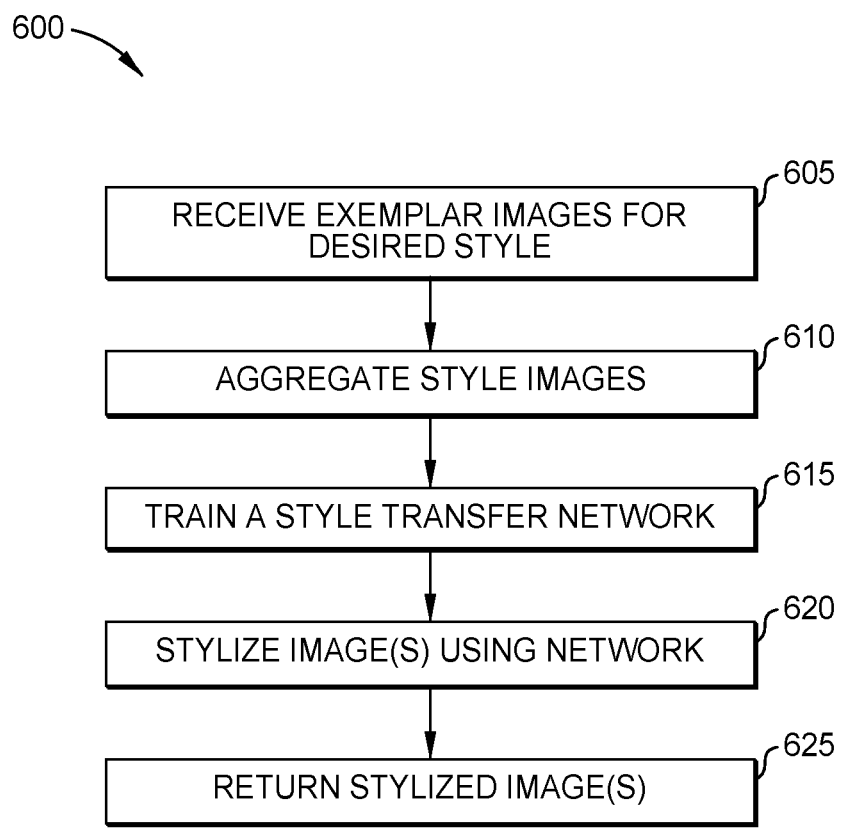
FIG. 6 is a flow diagram illustrating a method for training and using a style transfer neural network, according to one embodiment disclosed herein.

FIG. 6 is a flow diagram illustrating a method 600 for training and using a style transfer neural network, according to one embodiment disclosed herein. The method 600 begins at block 605, where the Generation Application 335 receives or retrieves exemplar images for the desired style. In at least one embodiment, these images are provided by the requesting user. That is, the user may manually review images and select ones that best depict the desired style. In another embodiment, the user indicates the style or theme (e.g., using keywords or phrases). The Generation Application 335 can then execute one or more image searches to retrieve style exemplars. The method 600 then proceeds to block 610.

At block 610, the Generation Application 335 aggregates the style images. In one embodiment, as discussed above, this includes tiling the images to create a single reference image. At block 615, the Generation Application 335 trains a style transfer network based on this single reference image (which may be an array or tile of images). The method 600 then proceeds to block 620, where the Generation Application 335 receives one or more input images, and refines/stylizes them using the trained network. In at least one embodiment, the input images correspond to newly-generated images from the generative model. In another embodiment, the input images are one or more highly-ranked seed images. At block 625, the Generation Application 335 returns the stylized image(s).

Figure 7:
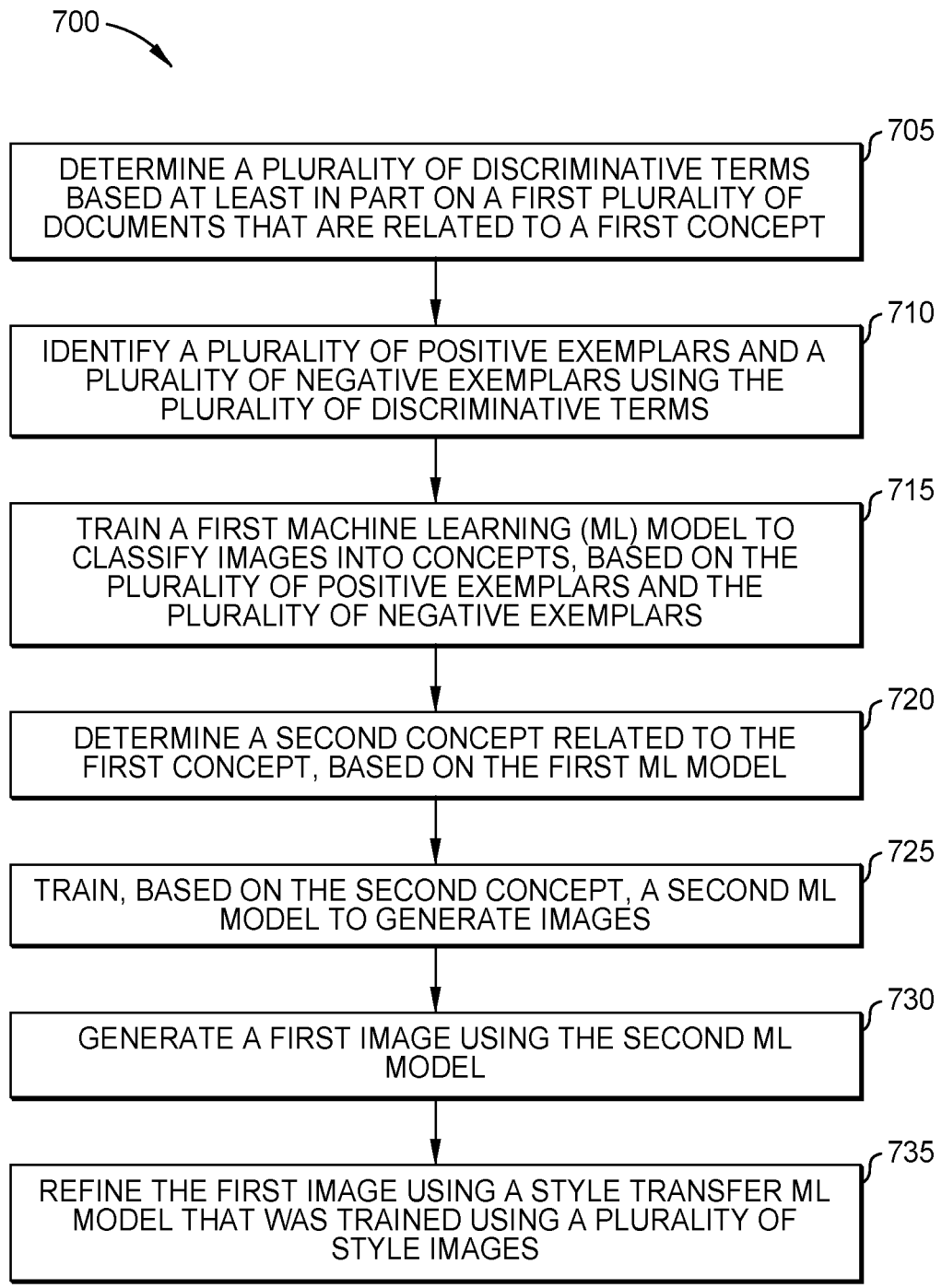
FIG. 7 is a flow diagram illustrating a method for automated generation of visual content using machine learning, according to one embodiment disclosed herein.

FIG. 7 is a flow diagram illustrating a method 700 for automated generation of visual content using machine learning, according to one embodiment disclosed herein. The method 700 begins at block 705, where a Generation Application 335 determines a plurality of discriminative terms based at least in part on a first plurality of documents that are related to a first concept. At block 710, the Generation Application 335 identifies a plurality of positive exemplars and a plurality of negative exemplars using the plurality of discriminative terms. The method 700 then proceeds to block 715, where the Generation Application 335 trains a first machine learning (ML) model to classify images into concepts, based on the plurality of positive exemplars and the plurality of negative exemplars. Further, at block 720, the Generation Application 335 determines a second concept related to the first concept, based on the first ML model. Additionally, at block 725, the Generation Application 335 trains, based on the second concept, a second ML model to generate images. The method 700 then continues to block 730, where the Generation Application 335 generates a first image using the second ML model. At block 735, the Generation Application 335 refines the first image using a style transfer ML model that was trained using a plurality of style images.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Generation Application 335) or related data available in the cloud. For example, the Generation Application 335 could execute on a computing system in the cloud and generate new stylized images. In such a case, the Generation Application 335 could evaluate existing data and generate new models, and store the models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   determining a plurality of discriminative terms based at least in part on a first plurality of documents that are related to a first concept;
   identifying a plurality of positive exemplars and a plurality of negative exemplars using the plurality of discriminative terms;
   training a first machine learning (ML) model to classify images into concepts, based on the plurality of positive exemplars and the plurality of negative exemplars;
   determining a second concept related to the first concept, based on the first ML model;
   training, based on the second concept, a second ML model to generate images;
   generating a first image using the second ML model; and
   refining the first image using a style transfer ML model that was trained using a plurality of style images.

2. The method of claim 1, wherein determining the plurality of discriminative terms comprises:
   searching one or more document repositories to retrieve the first plurality of documents that are related to the first concept;
   searching the one or more document repositories to retrieve a second plurality of documents that are unrelated to the first concept; and
   training a discriminative text model based on the first and second pluralities of documents.

3. The method of claim 1, wherein identifying the plurality of positive exemplars and the plurality of negative exemplars comprises:
   retrieving the plurality of positive exemplars by performing one or more searches using a first subset of the plurality of discriminative terms, wherein the first subset comprises terms that are associated with the first concept; and
   retrieving the plurality of negative exemplars by performing one or more searches using a second subset of the plurality of discriminative terms, wherein the second subset comprises terms that are not associated with the first concept.

4. The method of claim 1, wherein training the first ML model comprises:
   training the first ML model to classify each of the plurality of positive exemplars as the first concept; and
   training the first ML model to classify each of the plurality of negative exemplars as not the first concept, wherein the first ML model is thereby trained to generate scores for input images based on how closely they relate to the first concept.

5. The method of claim 1, wherein determining the second concept related to the first concept comprises:
   extracting a plurality of seed images from the first plurality of documents;
   ranking the plurality of seed images by evaluating each respective seed image of the plurality of seed images using the first ML model;
   selecting one or more of the plurality of seed images based on the ranking; and
   identifying one or more concepts reflected in the selected one or more of the plurality of seed images.

6. The method of claim 1, wherein training the second ML model comprises:
   retrieving a plurality of images by performing one or more searches using the second concept; and
   training a generative adversarial network (GAN) using the plurality of images.

7. The method of claim 1, wherein the style transfer ML model was trained by:
   receiving the plurality of style images, wherein the plurality of style images reflect a desired visual style of the first image;

tiling the plurality of style images to create a single style reference image; and training the style transfer ML model using the single style reference image.

8. A computer-readable storage medium containing computer program code that, when executed by operation of one or more computer processors, performs an operation comprising:

determining a plurality of discriminative terms based at least in part on a first plurality of documents that are related to a first concept;

identifying a plurality of positive exemplars and a plurality of negative exemplars using the plurality of discriminative terms;

training a first machine learning (ML) model to classify images into concepts, based on the plurality of positive exemplars and the plurality of negative exemplars;

determining a second concept related to the first concept, based on the first ML model;

training, based on the second concept, a second ML model to generate images;

generating a first image using the second ML model; and refining the first image using a style transfer ML model that was trained using a plurality of style images.

9. The computer-readable storage medium of claim 8, wherein determining the plurality of discriminative terms comprises:

searching one or more document repositories to retrieve the first plurality of documents that are related to the first concept;

searching the one or more document repositories to retrieve a second plurality of documents that are unrelated to the first concept; and training a discriminative text model based on the first and second pluralities of documents.

10. The computer-readable storage medium of claim 8, wherein identifying the plurality of positive exemplars and the plurality of negative exemplars comprises:

retrieving the plurality of positive exemplars by performing one or more searches using a first subset of the plurality of discriminative terms, wherein the first subset comprises terms that are associated with the first concept; and retrieving the plurality of negative exemplars by performing one or more searches using a second subset of the plurality of discriminative terms, wherein the second subset comprises terms that are not associated with the first concept.

11. The computer-readable storage medium of claim 8, wherein training the first ML model comprises:

training the first ML model to classify each of the plurality of positive exemplars as the first concept; and training the first ML model to classify each of the plurality of negative exemplars as not the first concept, wherein the first ML model is thereby trained to generate scores for input images based on how closely they relate to the first concept.

12. The computer-readable storage medium of claim 8, wherein determining the second concept related to the first concept comprises:

extracting a plurality of seed images from the first plurality of documents;

ranking the plurality of seed images by evaluating each respective seed image of the plurality of seed images using the first ML model;

selecting one or more of the plurality of seed images based on the ranking; and identifying one or more concepts reflected in the selected one or more of the plurality of seed images.

13. The computer-readable storage medium of claim 8, wherein training the second ML model comprises:

retrieving a plurality of images by performing one or more searches using the second concept; and training a generative adversarial network (GAN) using the plurality of images.

14. The computer-readable storage medium of claim 8, wherein the style transfer ML model was trained by:

receiving the plurality of style images, wherein the plurality of style images reflect a desired visual style of the first image;

tiling the plurality of style images to create a single style reference image; and training the style transfer ML model using the single style reference image.

15. A system comprising:

one or more computer processors; and a memory containing a program which when executed by the one or more computer processors performs an operation, the operation comprising:

determining a plurality of discriminative terms based at least in part on a first plurality of documents that are related to a first concept;

identifying a plurality of positive exemplars and a plurality of negative exemplars using the plurality of discriminative terms;

training a first machine learning (ML) model to classify images into concepts, based on the plurality of positive exemplars and the plurality of negative exemplars;

determining a second concept related to the first concept, based on the first ML model;

training, based on the second concept, a second ML model to generate images;

generating a first image using the second ML model; and refining the first image using a style transfer ML model that was trained using a plurality of style images.

16. The system of claim 15, wherein determining the plurality of discriminative terms comprises:

searching one or more document repositories to retrieve the first plurality of documents that are related to the first concept;

searching the one or more document repositories to retrieve a second plurality of documents that are unrelated to the first concept; and training a discriminative text model based on the first and second pluralities of documents.

17. The system of claim 15, wherein identifying the plurality of positive exemplars and the plurality of negative exemplars comprises:

retrieving the plurality of positive exemplars by performing one or more searches using a first subset of the plurality of discriminative terms, wherein the first subset comprises terms that are associated with the first concept; and retrieving the plurality of negative exemplars by performing one or more searches using a second subset of the plurality of discriminative terms, wherein the second subset comprises terms that are not associated with the first concept.

18. The system of claim 15, wherein training the first ML model comprises:

training the first ML model to classify each of the plurality of positive exemplars as the first concept; and training the first ML model to classify each of the plurality of negative exemplars as not the first concept, wherein the first ML model is thereby trained to generate scores for input images based on how closely they relate to the first concept.

19. The system of claim 15, wherein determining the second concept related to the first concept comprises:
   extracting a plurality of seed images from the first plurality of documents;
   ranking the plurality of seed images by evaluating each respective seed image of the plurality of seed images using the first ML model;
   selecting one or more of the plurality of seed images based on the ranking; and
   identifying one or more concepts reflected in the selected one or more of the plurality of seed images.

20. The system of claim 15, wherein the style transfer ML model was trained by:
   receiving the plurality of style images, wherein the plurality of style images reflect a desired visual style of the first image;
   tiling the plurality of style images to create a single style reference image; and
   training the style transfer ML model using the single style reference image.

* * * * *